H. S. DICKINSON.
MECHANICAL MOVEMENT.
APPLICATION FILED OCT. 16, 1917.
1,354,470.
Patented Oct. 5, 1920.
2 SHEETS—SHEET 1.
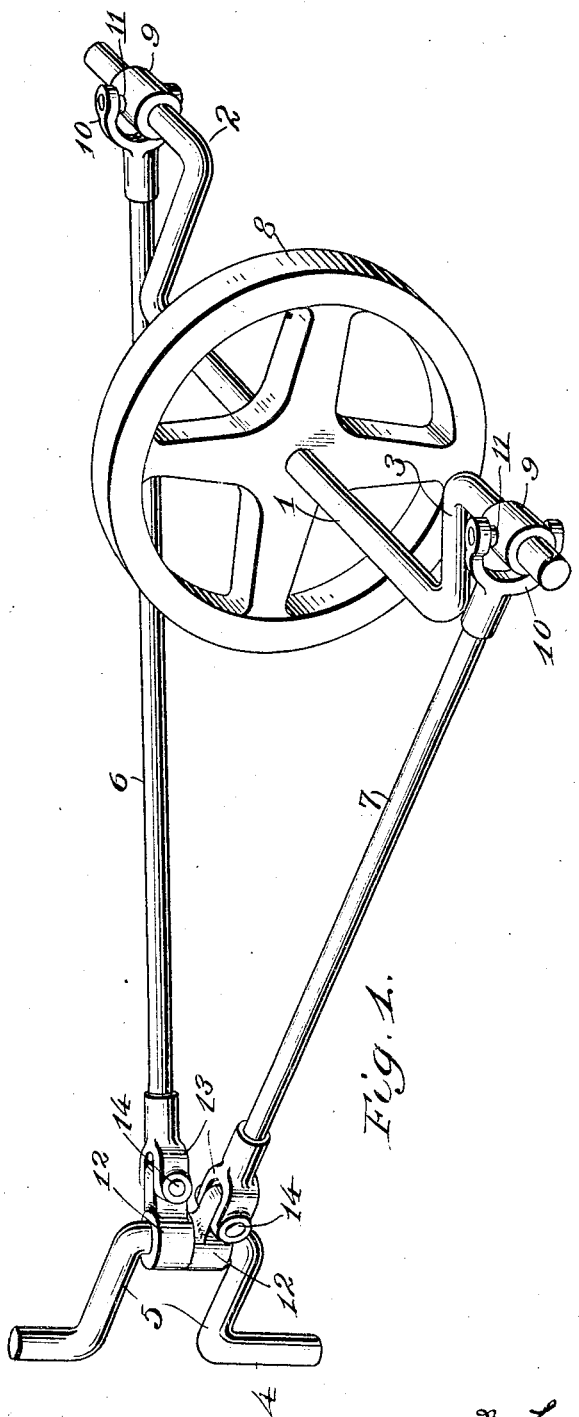
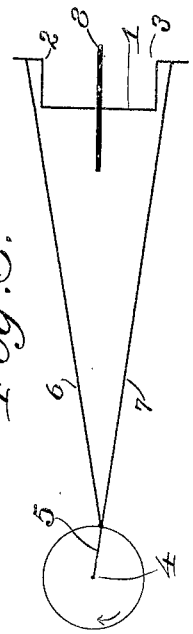
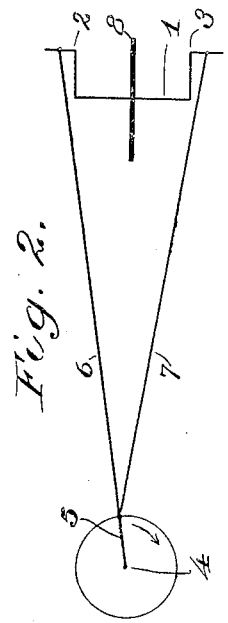
Inventor
H. S. Dickinson
By his Attorneys
Rogers, Kennedy & Campbell

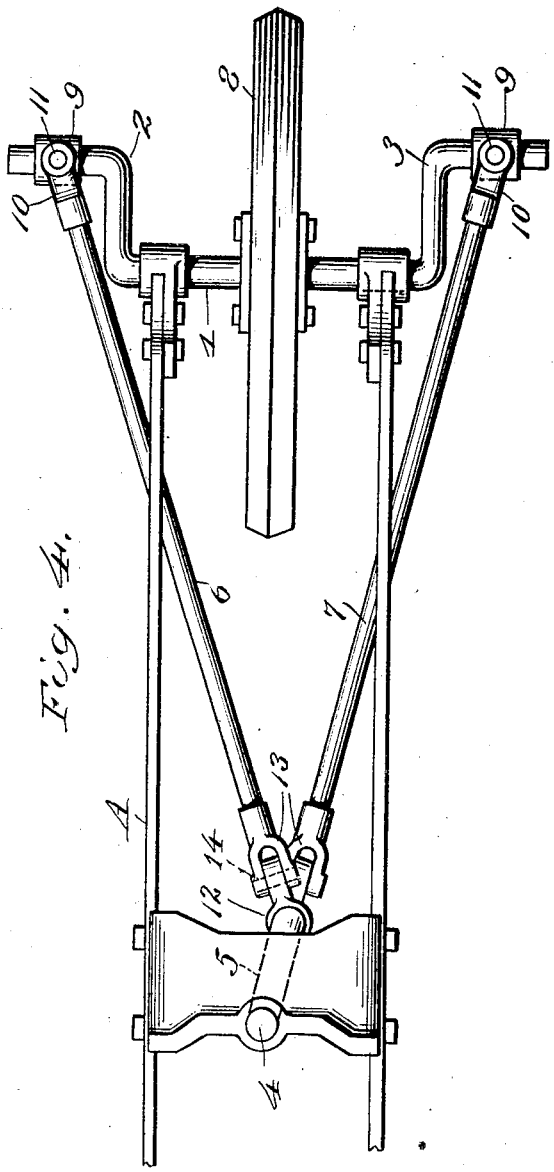

UNITED STATES PATENT OFFICE.

HARRY S. DICKINSON, OF MOLINE, ILLINOIS, ASSIGNOR TO MOLINE PLOW COMPANY, A CORPORATION OF ILLINOIS.

MECHANICAL MOVEMENT.

1,354,470.  Specification of Letters Patent.  Patented Oct. 5, 1920.

Application filed October 16, 1917. Serial No. 196,812.

*To all whom it may concern:*

Be it known that I, HARRY S. DICKINSON, a citizen of the United States, residing at Moline, in the county of Rock Island and State of Illinois, have invented certain new and useful Improvements in Mechanical Movements, of which the following is a specification, reference being had therein to the accompanying drawing.

This invention relates to mechanical movements designed to transmit the rotary motion of one shaft to another shaft angularly related to the first, the object of the invention being to avoid the use of pinions, sprocket chains, eccentrics, and like gearing, and produce a form of mechanism which will transmit the power positively, uniformly and effectively and which will be simple and durable in construction and reliable in its operation.

With these and other objects in view my invention consists in connecting two shafts together which are related angularly to each other, for instance one at right angles to the other, by means of two connecting rods or pitmen pivoted at one of their ends respectively to two angularly related cranks on one of the shafts and pivoted at their opposite ends to the other shaft on coincident axes offset from and parallel with the axis of the latter shaft.

My improved mechanism is of particular value and advantage in connection with seeding machines in transmitting the motion from the ground wheel on a horizontal shaft, to the seed discharging mechanism operated by a vertical shaft, the absence of the usual transmitting gearing between these parts such as pinions, eccentrics, sprocket wheels, chains, and like gearing, preventing the obstruction of the mechanism or its clogging by soil or trash or other obstructing materials encountered in the field, and insuring the positive and regular transmission of the power, and a uniformity in the discharge of the seed and its deposit in the ground. It will be manifest, however, that the invention is not limited to such special use, but is applicable as well to other forms of machines and mechanisms in which the rotary movement of one shaft is to be transmitted to a second shaft angularly related to the first.

In the accompanying drawings:

Figure 1 is a perspective view of a mechanical movement embodying my invention.

Figs. 2 and 3 are diagrammatic views illustrating the operation of the same.

Fig. 4 is a top plan view of the device supported in a suitable sustaining frame.

Referring to the drawings:

Referring to Fig. 1, the numeral 1 designates a horizontal shaft provided at one end with a crank 2, and at the opposite end with a crank 3, which two cranks are angularly related to each other. 4 designates a vertical shaft provided with a single crank 5. 6 and 7 designate two connecting rods or pitmen which are pivoted at one of their ends respectively to the two cranks 2 and 3 on the shaft 1, whence they converge toward each other and have their opposite ends arranged closely side by side and pivoted on the crank 5, this crank constituting coincident axes for the ends of the rods, which axes are offset from and parallel with the axis of rotation of the crank. These two shafts are mounted in suitable bearings in a sustaining frame A.

The power may be applied to either of the two shafts, but in the present instance it is intended to be applied to the horizontal shaft by means of a driving wheel 8 fixed to the shaft between the two cranks thereon, which wheel would, in the use of the mechanism in a seeding machine, act as the ground wheel and would be rotated by the advance of the machine through the field.

The pivotal connections of the ends of the connecting rods with the cranks 2 and 3 are in the form of sleeves 9 in which the cranks are respectively rotatably mounted, the ends of the rods being provided with forked arms 10 extending respectively above and below the sleeves and pivoted thereto by vertical pivot pins 11, the form of connection permitting the rods to swing horizontally about the axes of the pins 11 as their opposite ends are correspondingly swung in the rotation of the crank 5. The pivotal connection of the opposite ends of the rods is in the form of sleeves 12 disposed side by side one above the other and in which sleeves the crank 5 is rotatably mounted, the ends of the rods being provided with forked arms 13 pivotally connected to the sleeves by means of horizontal pivot pins 14, this form of connection permitting the rods to swing up and down about the axes of the pins 14 as their forward ends are correspondingly moved in the rotation of the cranks 2 and 3.

In the operation of the device, assuming the movement to be clockwise as indicated by the arrow in Fig. 2, it will be seen that crank 2 will produce a rotation until it has reached the outermost point or "dead center" of its throw. At that instant the connecting rod 6, the sleeve 9, the sleeve 12, and the axis of shaft 4, will be in exact alinement. At this moment crank 3 being retarded angularly with respect to crank 2, will not have reached its outermost position and consequently will be in position to exert a pull through its sleeve 9, connecting rod 7 and sleeve 12 upon crank 5, and since there will be some angularity with respect to the line of centers between sleeve 9 and axis of crank shaft 4, it will be possible for crank 3 to produce a further rotative movement in a clockwise direction of the shaft 4. This movement will continue until the cranks reach the positions shown in Fig. 3, when crank 3 will have reached its outermost position and sleeves 9 and 12 and the axis of shaft 4 will be in alinement. At this instant crank 2 has advanced "beyond center" and is in position, on account of the angularity between the axis of shaft 4, sleeve 12 and sleeve 9 to exert an influence to produce a continued clockwise movement of shaft 4. The passage of the "dead centers" on the opposite throw of crank 5 will be exactly similar as described for the inboard throw and illustrated in Figs. 2 and 3.

The mechanism will operate without interference with each other of the cranks on the two shafts and without binding, as long as the angle formed by the axis of shaft 4, sleeve 12, and sleeve 9 of one rod, or by said axis and the sleeve 12 and sleeve 9 of the other rod, are without the critical angles for the particular value of friction for the driving device. It is clearly evident that as cranks 2 and 3 are spread apart upon the shaft, this angle may be increased so as to include any reasonable variation of the critical angle due to the effects of friction. In the mechanism shown, the two cranks 2 and 3 and the ends of the connecting rods pivoted thereto are widely separated from each other, while the opposite ends of the connecting rods are disposed in close proximity, this arrangement producing a relation of the parts which will avoid any interference or binding in the rotation of the two shafts by the connecting rods, and will enable the power to be transmitted from one to the other in a positive, uniform and regular manner.

In the accompanying drawings and foregoing description I have disclosed my invention in the particular form and arrangement of the parts which I prefer to adopt and which in practice has been found to answer to a satisfactory degree the ends to be attained. It will be manifest, however, that the details may be variously changed and modified without departing from the spirit of my invention; and it will be understood that the invention is not limited to any particular form or construction of the parts except in so far as hereinafter specified in the claims.

Having thus described my invention, what I claim is:

1. In a mechanical movement, the combination of two shafts angularly related to each other, two cranks on one of said shafts angularly related to each other, and two connecting rods pivoted at one of their ends respectively to the two cranks and pivoted at their opposite ends to the other shaft on coincident axes offset from and parallel with the axis of rotation of the latter shaft.

2. In a mechanical movement, the combination of a driving shaft, a driven shaft angularly related thereto, a single crank on one of said shafts, a pair of cranks on the other shaft angularly related to each other, and two connecting rods pivoted at one of their ends to the single crank and pivoted at their opposite ends respectively to the cranks of the pair.

3. In a mechanical movement, the combination of a driving shaft, a driven shaft angularly related thereto, a single crank on one of said shafts, a pair of cranks on the other shaft widely separated from and angularly related to each other, and two connecting rods pivoted at one of their ends to the single crank and pivotally connected at their opposite ends respectively to the cranks of the pair.

4. In a mechanical movement, the combination of a shaft, a second shaft angularly related thereto, a single crank on one of said shafts, a pair of cranks on the other shaft widely separated from and angularly related to each other, and two connecting rods pivoted at one of their ends respectively to the cranks of the pair, and pivoted at their opposite ends closely side by side to the single crank.

5. In a mechanical movement, the combination of a horizontal driving shaft, two driving cranks thereon angularly related to each other, a vertical driven shaft, a single driven crank thereon, and two connecting rods pivoted at one of their ends respectively to the two driving cranks, and pivoted at their opposite ends to the single driven crank.

6. In combination, a frame, an axle journaled in bearings carried by the front end of said frame, a carrying wheel mounted upon said axle, crank arms secured to opposite ends of said axle at varying angles, a vertically disposed shaft rotatably mounted upon the rear end of said frame in substantially a central longitudinal line relative to said crank arms, a single crank arm on said shaft, and connecting rods operatively coupling said axle crank arms with the single crank arm on said vertical shaft.

7. In combination, a frame, an axle journaled in bearings carried by the front end of said frame, a carrying wheel mounted centrally upon said axle, crank arms secured to opposite ends of said axle at varying angles, a vertically disposed shaft rotatably mounted upon the rear end of said frame in substantial alinement with the tread of said carrying wheel, a single crank arm on said shaft, separate links journaled upon said single crank arm, and connecting rods having their front ends operatively connected with said axle crank arms and their rear ends flexibly connected with said links.

8. In combination, a frame, an axle journaled in bearings carried by the front end of said frame, a carrying wheel mounted centrally upon said axle, crank arms secured to opposite ends of said axle at varying angles, links having one end thereof journaled upon said crank arms, a vertically disposed shaft rotatably mounted upon the rear end of said frame in substantial alinement with the tread of said wheel, a single crank arm on said shaft, separate links journaled upon said single crank arm, and connecting rods having their front ends pivotally connected with the opposite ends of said links journaled upon the crank arms of said axle and their rear ends pivotally connected with the links journaled upon said single crank arm.

In testimony whereof, I have affixed my signature.

HARRY S. DICKINSON.